(12) United States Patent
Griffin et al.

(10) Patent No.: US 6,298,311 B1
(45) Date of Patent: Oct. 2, 2001

(54) INFRARED OCCUPANT POSITION DETECTION SYSTEM AND METHOD FOR A MOTOR VEHICLE

(75) Inventors: Dennis Palmer Griffin, Noblesville; William W. Fultz, Carmel; Robert Allan Perisho, Jr., Russiaville; Peter Alan Thayer, Indianapolis; Cunkai Wu, Kokomo, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/260,224

(22) Filed: Mar. 1, 1999

(51) Int. Cl.$^7$ .............................. G01B 11/00; B60R 21/00
(52) U.S. Cl. ...................... 702/150; 702/159; 280/735; 356/622
(58) Field of Search ...................................... 702/150–155, 702/159; 280/730.1, 734, 735; 180/268–269, 271; 701/45–46, 49; 356/375–376, 614, 621–622

(56) References Cited

U.S. PATENT DOCUMENTS

| | | | |
|---|---|---|---|
| 5,330,226 | * | 7/1994 | Gentry et al. .......................... 280/735 |
| 5,384,716 | * | 1/1995 | Araki et al. ............................ 702/134 |
| 5,737,083 | * | 4/1998 | Owechko et al. .................... 356/375 |
| 5,785,347 | * | 7/1998 | Adolph et al. ........................ 280/735 |
| 6,113,137 | * | 9/2000 | Mizutani et al. ..................... 280/735 |

OTHER PUBLICATIONS

U.S. application No. 09/237,309, filed Jan. 26, 1999.

* cited by examiner

*Primary Examiner*—Patrick Assouad
*Assistant Examiner*—Bryan Bui
(74) *Attorney, Agent, or Firm*—Jimmy L. Funke (57) ABSTRACT

An improved IR occupant position detection system that provides accurate and reliable classification and position information at a speed sufficient to timely inhibit or otherwise control deployment of occupant restraints. A two-dimensional array of IR emitters is selectively activated to periodically illuminate two or more of predetermined viewing planes in the vicinity of a passenger seating area, and the reflected IR energy is detected by a photo-sensitive receiver and analyzed to detect the presence of an occupant, to classify the occupant, and to identify and dynamically track the position of the occupant's head/torso relative to predefined zones of the passenger compartment. Modulating the intensity of the emitted IR beams with a known carrier frequency, band-pass filtering the received signal, and synchronously detecting the filtered signal distinguishes the reflected IR energy from other signals picked up by the IR receiver. Additionally, a two stage adaptive control mechanism compensates for the variation in intensity of the reflected energy with distance between the emitter and the occupant. The emitter is implemented with orthogonal anode and cathode power rails with individual IR LED elements placed at each anode-cathode intersection. Optical dispersion within the package is greatly reduced by an opaque cover layer that effectively forms a well for each LED element.

24 Claims, 10 Drawing Sheets

|     |     |     |
|-----|-----|-----|
| 1,1 | 1,2 | 1,3 |
| 2,1 | 2,2 | 2,3 |
| 3,1 | 3,2 | 3,3 |
| 4,1 | 4,2 | 4,3 |
| 5,1 | 5,2 | 5,3 |
| 6,1 | 6,2 | 6,3 |
| 7,1 | 7,2 | 7,3 |
| 8,1 | 8,2 | 8,3 |
| 9,1 | 9,2 | 9,3 |
| 10,1| 10,2| 10,3|

OOP / IP regions, 256

FIGURE 12

| H1 | C1  | H3 |
|----|-----|----|
| C3 | CRB | C4 |
| H2 | C2  | H4 |

INFRARED OCCUPANT POSITION DETECTION SYSTEM AND METHOD FOR A MOTOR VEHICLE

TECHNICAL FIELD

This invention relates to a motor vehicle control system, and more particularly to a system and method for detecting the position of an occupant of the vehicle.

BACKGROUND OF THE INVENTION

Vehicle occupant position detection systems are useful in connection with air bags and other pyrotechnically deployed restraints as a means of judging whether, and/or how forcefully, to deploy the restraint. Ideally, the system should be capable of classifying the type of occupant (i.e., large adult, small adult, child, etc.) and the position of the occupant relative to the point of deployment of the air bag. Various systems incorporating one or more infrared and/or acoustical ranging sensors have been proposed for this purpose; see, for example, the U.S. Pat. Nos. 5,330,226 and 5,785,347. In general, such systems emit one or more beams of infrared energy to define a corresponding number of viewing fields, and receive the reflected energy to detect the presence of an occupant within the viewing fields. However, the information obtained by such techniques is sometimes corrupted by other light sources (such as reflected sunlight, or pulsed incandescent light), and even under best conditions is typically insufficient to accurately classify the occupant type and position. For example, it may be desired to deploy an air bag even though the occupant's hand or arm is near the point of deployment, but undesirable to deploy if the occupant's head or torso is near the point of deployment. For this reason, other position sensors or weight sensors are typically used in combination with a ranging sensor to provide a more comprehensive understanding of occupant classification and position. Unfortunately, such systems tend to be quite costly, and are difficult to package in the automotive environment. Moreover, a relatively high speed of response is required so that deployment can be properly inhibited or allowed when the occupant position quickly changes, possibly in anticipation of an impending collision. Accordingly, what is needed is a low-cost system that can accurately and quickly recognize an occupant for purposes of classification and position.

SUMMARY OF THE INVENTION

The present invention is directed to an improved infrared (IR) occupant recognition system that is low in cost, and provides accurate and reliable classification and position information at a speed sufficient to timely inhibit or otherwise control deployment of occupant restraints. A two-dimensional array of IR emitters is selectively activated to periodically illuminate two or more predetermined viewing planes in the vicinity of a passenger seating area, and the reflected IR energy is detected by a photo-sensitive receiver and analyzed to detect the presence of an occupant, to classify the occupant, and to determine the position of the occupant relative to predefined zones of the passenger compartment.

One aspect of the invention concerns a technique for reliably distinguishing the reflected IR energy from other signals picked up by the IR receiver. This involves modulating the intensity of the emitted IR beams with a known carrier frequency, band-pass filtering the received signal, and synchronously detecting the filtered signal.

Another aspect of the invention concerns a two stage adaptive control mechanism that compensates for the variation in intensity of the reflected energy. A first stage adaptively adjusts the gain of the receiver circuit, while a second stage adaptively adjusts the intensity of the emitted signal.

A further aspect of the invention concerns a novel mechanization of the two-dimensional emitter array which reduces manufacturing cost and package size, while retaining the flexibility of tailoring the dimensions of the array to suit a particular application. This is achieved through the use of orthogonal anode and cathode power rails with individual IR LED elements placed at each anode-cathode intersection. One of the anode and cathode terminals of each LED is mounted on its respective power rail, and the other is wire-bonded to its respective power rail. This eliminates interference between wire-bonds, reduces the number of driver circuits, and significantly shrinks the package size. Optical dispersion within the package is minimized by an opaque cover layer that effectively forms a deep cavity around each LED element.

A further aspect of the invention concerns a methodology for using the two-dimensional emitter array to recognize an occupant and quickly track any motion of the recognized occupant. This is achieved by identifying the emitter array positions corresponding to the torso of a recognized occupant, and scanning at least those positions at a rate much faster than the other positions.

BRIEF DESCRIPTION OF THE DRAWINGS

The present invention will now be described, by way of example, with reference to the accompanying drawings, in which:

FIGS. 7–11 and 14 are flow diagrams representative of computer program instructions performed by the microprocessor of FIG. 5.

DESCRIPTION OF THE PREFERRED EMBODIMENT

Figure 1:
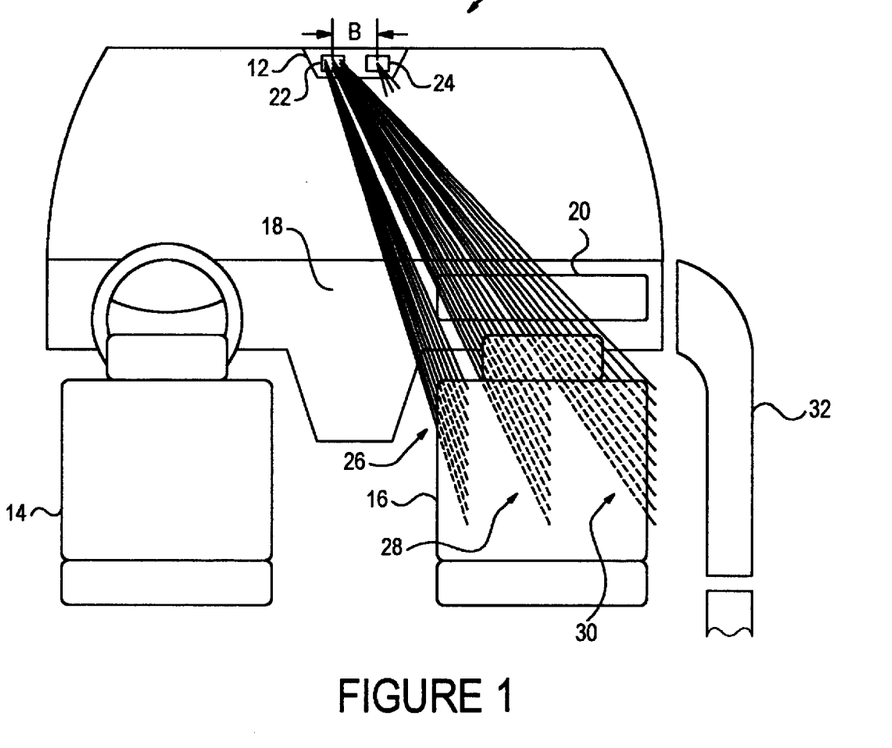
FIG. 1 is a diagram illustrating a portion of the passenger compartment of a motor vehicle equipped with an inflatable restraint and the IR occupant position and detection system of this invention.

Referring to the drawings, and particularly to FIG. 1, the reference numeral 10 generally designates a vehicle occupant position detection system according to this invention. In the illustrated embodiment, the system 10 is mechanized as a single module, mounted in a ceiling console 12 between and above the driver and passenger seats 14, 16. Obviously, other locations for the system 10 are also possible, but the illustrated location is generally preferred because it is least intrusive, easy to package and centrally located for flexibility in sensing one or more of several occupant positions, if desired. Of course, the vehicle may have a bench-style seat instead of the illustrated bucket seats 14, 16; in any event, the normal occupant positions on the seat(s) are defined by the placement of the seat belts (not shown).

In general, the system 10 is described herein in the context of an otherwise conventional supplemental inflatable restraint system, including an air bag 20 installed in the instrument panel 18 forward of the passenger seat 16. The system 10 interacts with the restraint system by scanning the vicinity of the seat 16 where an occupant might be positioned, and producing a control signal to either inhibit or allow deployment of the air bag 20 in response to a crash event of sufficient severity, based on the occupant classification, and/or the position of a recognized occupant relative to the air bag 20. The criteria concerning whether to enable or inhibit deployment are outside the scope of this invention, and are generally defined by the vehicle manufacturer or governmental regulation. It is generally agreed, however, that deployment of the air bag 20 should be disabled if the seat is unoccupied, or occupied by a front or rear facing infant seat, or by an out-of-position adult or small child, where the term out-of-position is defined by a predetermined proximity of the occupant's head or torso to the point of deployment of the air bag 20. Accordingly, the objective of the system 10 is to classify or recognize the various types of occupants (or the absence of an occupant), and to detect if an occupant is out-of-position.

As indicated above, the information that can be gleaned from any given sensor type or location is generally inadequate to confidently classify an occupant and detect an out-of-position condition. However, the present invention overcomes the limitations of prior sensing systems through the use of a two-dimensional IR emitter 22 that is selectively activated to periodically illuminate multiple predetermined viewing planes in the vicinity of passenger seat 16, as shown in FIG. 1. Individual LEDs of the emitter 22 are selectively activated to produce an IR beam whose direction is determined by the position of the LED in the array and the optical parameters of a lens system incorporated within emitter 22. As described in further detail below in respect to FIG. 3, the constituent LEDs are arranged in a rectangular grid three columns wide and ten rows in length. The emitter 22 is positioned in the console 12 so that the IR beams emitted by the LEDs in the first, second and third columns of the emitter 22 are respectively directed along first, second and third planes identified generally by the reference numerals 26, 28 and 30 in FIG. 1. The plane 26 includes the normal orientation of an occupant's left leg and torso when normally seated, the plane 28 includes the normal orientation of the occupant's right leg and torso, and the plane 30 includes the interior edge of the passenger door 32. In each plane, some of the beams are directed through an out-of-position (OOP) zone forward of the seat 16 and in proximity to the air bag 20, some are directed onto the seat 16 or door 32, and some are directed above the seat 16 and/or door 32. The IR energy reflected by the occupant or seat 16 or door 32 is detected by a photo-sensitive receiver 24 disposed a predetermined distance B from the emitter 22, and the range of the occupant from the emitter 22 is determined based on a pair of coordinate currents developed by the receiver 24, as described in further detail below in reference to FIGS. 2 and 5.

Figure 2:
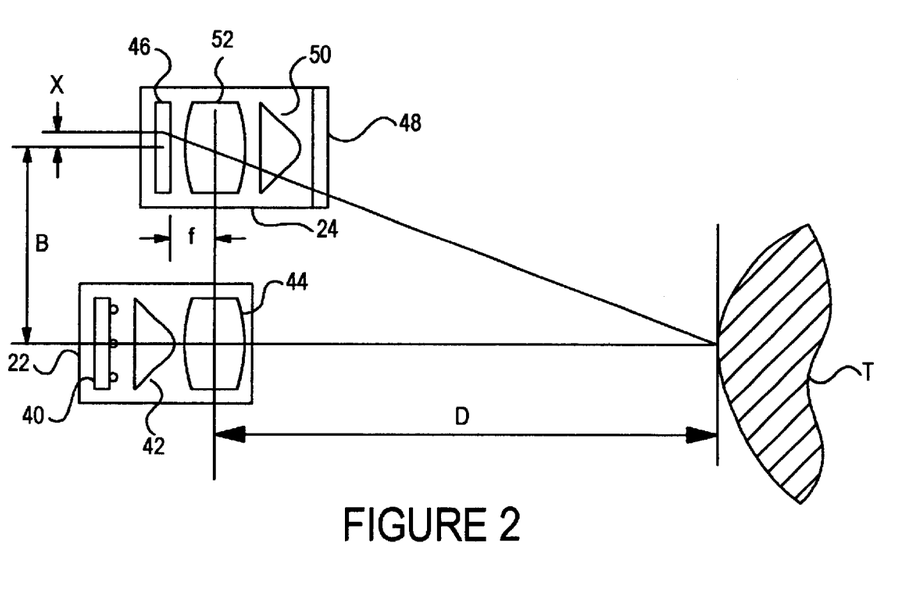
FIG. 2 is a diagram illustrating the range determination technique used by the system of FIG. 1.

As best seen in FIG. 2, the emitter 22 comprises an IR LED array 40 and a lens system comprising an aspheric element 42 for concentrating IR light emitted from the array 40, and a symmetrical convex lens 44 for focusing the light on a target T, which in the illustrated embodiment, represents the passenger seat 16 or an occupant thereof. As indicated above, the array 40 comprises a two-dimensional arrangement of selectively activated IR LEDs, and is described in detail below in reference to FIGS. 3–4. The receiver 24 comprises a photo-sensitive device (PSD) 46 and a lens system comprising an IR filter 48, an aspheric element 50 for imaging the received IR light, and a symmetrical convex lens 52 for focusing the imaged light on the PSD 46. The PSD 46 is a conventional two-dimensional element, and provides a pair of coordinant currents, referred to herein as ix and iy, corresponding to the centroid of the IR light impinging on the active surface of the device. The range of the target T from the emitter/receiver pair is determined by the location of the received IR light relative to the emitted light. In the illustration of FIG. 2 where B is the distance between emitter 22 and receiver 24, f is the focal length of the lens 52, X is the location of the received light relative to the axis of the PSD 46, the range or distance D of the target T is expressed as (f*B/x), where x can be determined by the ratio (ix−iy)/(ix+iy). As described below, an important aspect of this invention involves properly selecting an illumination pattern and properly analyzing the received range information.

Figure 3:
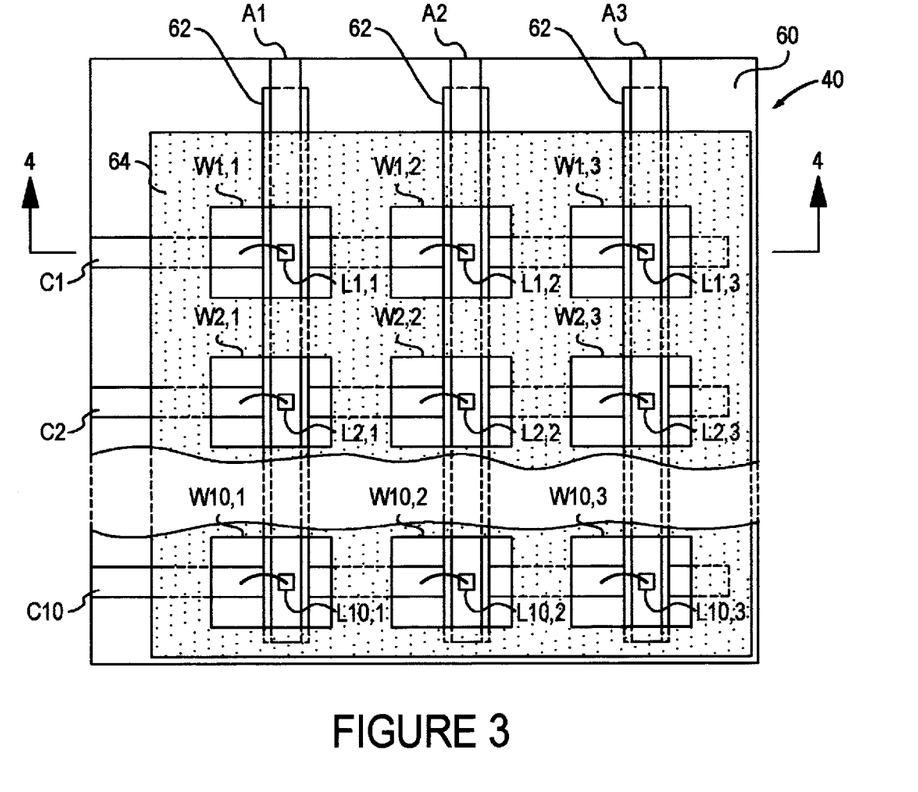
FIG. 3 is a diagram of a two-dimensional IR LED emitter array used in the system of FIG. 1.
Figure 4:
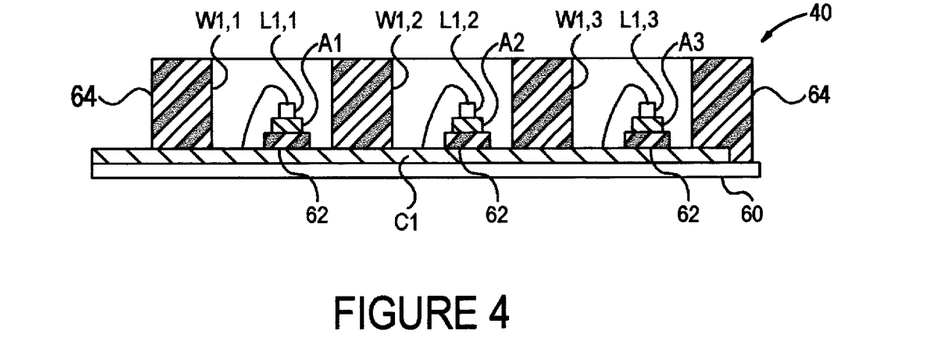
FIG. 4 is a cross-sectional view of the emitter array of FIG. 3, taken along lines 4—4 of FIG. 3.

FIGS. 3 and 4 depict a particularly advantageous mechanization of the emitter array 40, in which individual IR LED elements L are arranged in a two-dimensional grid designated by "row" and "column" coordinate positions to form a three-by-ten array. Obviously, other array dimensions could be used as well. The horizontal "rows" are defined by the parallel cathode conductor segments C1–C10, while the vertical "columns" are defined by the parallel anode conductor segments A1–A3. For convenience, the portion of the array 40 between conductor segments C2 and C10 has been omitted from FIG. 3, as indicated. FIG. 4 depicts a cross-sectional view of the array through the center of cathode conductor segment C1, as indicated by the section lines 4—4 in FIG. 3. The LED elements L are located at the intersections of the anode and cathode conductor segments A1–A3 and C1–C10, and are designated by their "row, column" coordinate position. For example, the LED element in the upper left corner of the array 40 is designated as L1,1 and the LED element in the opposite corner is designated as L10,3.

In the illustrated embodiment, the cathode conductor segments C1–C10 are formed on a substrate 60, and the anode conductor segments A1–A3 are then formed along with underlying segments 62 of insulation or dielectric material such that the segments 62 electrically isolate the anode and cathode segments at the intersections thereof. The anode terminal of each LED element L is mounted on the respective anode conductor segment A1–A3 and cathode terminal is wire bonded to the underlying cathode conductor segment C1–C10 in an area adjacent the anode conductor segment. A cover layer 64 formed atop the conductor segments A1–A3, C1–C10, insulator 62 and substrate 60 is windowed to define a cavity or window W (each being designated by its row, column coordinate position) around each of the LED elements L. As indicated in FIG. 4, the cover layer 64 is relatively thick compared to the conductor segments and LED elements L, thereby minimizing scattering of the IR light emitted by the LED elements L, and increasing the intensity of the focused light beams. In the illustrated embodiment, the substrate 60 is ceramic, and the conductor segments A1–A3, C1–C10, insulation segments 62 and cover layer 64 are formed using conventional thick film manufacturing processes, but obviously, a similar structure could be produced with different manufacturing processes. Other design variations are also possible; for example, the cathode conductor segments C1–C10 could be formed atop the anode conductor segments A1–A3, if desired.

The above-described array configuration and obvious variations thereof are particularly advantageous for a number of reasons, including improved light emission (spot quality) and significantly reduced package size, compared to conventional arrays and devices. The improved spot quality of the emitted light is achieved by the cover layer 64, as describe above. The use of a row-column selectable array significantly reduces the number of conductor terminals required for selective activation of individual LED elements, as well as the number of external driver circuits that interface with the array 40. Moreover, the wire bonds are very short in length and do not interfere with each other. Further, the anode conductor segments A1–A3 act as heatsinks for the LED elements, reducing the size and complexity of auxiliary heatsinks that may be required. These factors enable the construction of a multi-element array in flexible configurations, and with a very small size that can easily be packaged behind a minimum diameter lens, resulting in a two-dimensional emitter that is economical to produce, that reduces system cost, and that can be easily packaged in an automotive or other space restricted environment.

Figure 5:
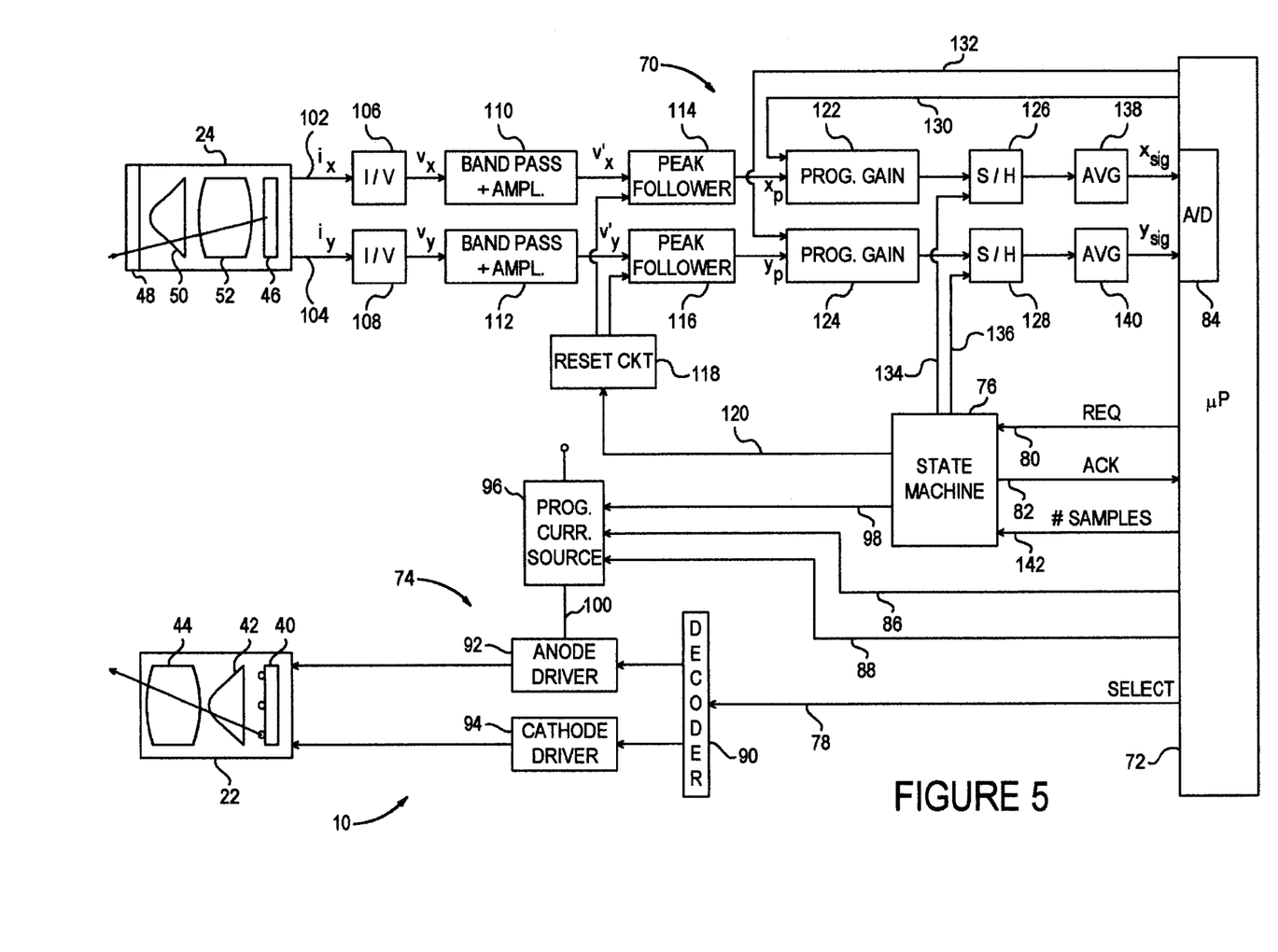
FIG. 5 is a block diagram of the system of FIG. 1, including a programmed state-machine and microprocessor.

FIG. 5 is a block diagram of the vehicle occupant position decection system 10 of FIG. 1. The system 10 comprises the emitter 22 and receiver 24, a receiver circuit 70 for extracting occupant range related signals from the ix and iy outputs of the PSD 46, a microprocessor ($\mu$P) 72 for receiving and analyzing the range signals, a transmitter circuit 74 for activating the IR LED array 40, and a State Machine 76 for coordinating the operation of the transmitter and receiver circuits 74, 70. In general, the microprocessor 72 selects a particular LED element (via Select line 78) and requests the State Machine 76 (via Request Line 80) to obtain the range signals for the selected LED. The State Machine responds by activating the selected LED element, controlling the receiver circuit 70 to synchronously detect and capture the received range signals, and signaling the microprocessor (via Acknowledgement line 82) that the range signals are available at its A/D input port 84.

The selected LED element of array 40 is activated with a pulse of high frequency sinusoidal current to produce an intensity modulated IR light beam fitting into the pattern generally described above in reference to FIG. 1. The frequency of the activation current is fixed by microprocessor 72 (via line 86) and its magnitude is controlled by the microprocessor 72 (via line 88) to compensate for variations in the reflected signal strength, as explained below. The decoder 90 receives the data on the microprocessor Select Line, and activates semiconductor switch elements in the anode and cathode driver circuits 92 and 94 corresponding to the column and row address of the selected LED element. The anode drive circuit couples the respective anode conductor segment A1–A3 of array 40 to a Programmable Current Source 96, which when enabled by State Machine 76 (via line 98), develops and outputs a sinusoidal drive current on line 100, at the frequency and amplitude dictated by microprocessor 72 (via lines 86, 88). The cathode drive circuit 94 couples the respective cathode conductor segment C1–C10 to the system common or ground.

When the IR light pulse thereby produced by the emitter 22 illuminates the passenger seat 16, an occupant, or the door 32, a reflected light pulse at the same frequency (intensity modulation) is returned to receiver 24, which produces the coordinate currents ix and iy on lines 102 and 104. Unfortunately, the components of the ix and iy signals corresponding solely to the reflected IR light pulse are buried in other signals (considered as noise to the system 10) arising from direct or reflected ambient light produced by sources both inside and outside the vehicle. However, the receiver circuit 70 is able to extract the ix and iy signal components corresponding to the reflected IR light pulse by converting ix and iy to voltage signals vx, vy with I/V conversion circuits 106, 108 and band-pass filtering the voltage signals vx, vy with the band-pass filter circuits 110, 112. This is possible because the components of the ix and iy signals corresponding to the reflected IR light pulse have a characteristic frequency corresponding to the intensity modulation frequency of the emitted IR light pulse. Thus, the band pass filters 110, 112 pass only the desired components of the vx and vy signals, and reject all other components as noise. In practice, the LED elements may be activated at a frequency of 20 kHz–50 kHz, with the band pass filters 110, 112 tuned to distinguish signals of the emitted frequency from other light sources. The extracted vx and vy signals are then amplified, as also indicated at blocks 110 and 112, to form the signals vx' and vy'.

The extracted and amplified coordinate signal voltages vx' and vy' are then synchronously detected by the Peak Follower circuits 114, 116 and the Reset Circuit 118, which is activated by State Machine 76. The Peak Follower circuits 114, 116 generate output voltages xp and yp that track peak instantaneous voltage of the respective signals vx' and vy', and the State Machine 76 controls the operation of the Reset Circuit 118 (via line 120) so that the Peak Follower circuits 114, 116 are active only at the peak intensity points of the sinusoidal current waveform generated by the Programmable Current Source 96. The timing information is available to the State Machine 76 because the sinusoidal current has a fixed frequency (and duty cycle) and is triggered on and off by the State Machine 76. This provides further immunity from any noise component present in vx' and vy' signals. The peak signal outputs xp and yp are then amplified by Programmable Gain Amplifiers 122 and 124, providing amplified input voltages to sample-and-hold (S/H) circuits 126, 128. As explained below, the gains of blocks 122 and 124 are controlled by the microprocessor 72 (via lines 1 30 and 132) to compensate for variations due to the range of target T. The State Machine 76 triggers the S/H circuits 126, 128 (via lines 134 and 136) one or more times during each LED activation pulse, and the sampled signal values are provided as inputs to the respective Averaging circuits 138, 140, which in turn provide inputs xsig, ysig to the microprocessor A/D port 84. The Averaging circuits 138, 140 are required because the State Machine 76 triggers the S/H circuits 126, 128 two or more times in succession for improved accuracy, as described below in reference to FIG. 6. In the illustrated embodiment, the microprocessor 72 determines the number of samples and signals the State Machine 76 accordingly via line 142.

As indicated above, the microprocessor 72 controls both the amplitude of the LED activation current and the gain of the Programmable Gain Amplifiers 122, 124 to compensate for variations in the strength of the reflected signal. The adjustments are important because the PSD output signals ix and iy may vary in amplitude by several orders of magnitude depending on range. As explained below in reference to FIG. 9, the microprocessor 72 reads the averaged signals xsig, ysig applied to its A/D input port 84 and compares the signals to upper and lower thresholds UT1 and LT1 corresponding to a desired input signal range of A/D input port 84. If a signal xsig or ysig exceeds the upper threshold UT1, the gain of the respective Programmable Gain Amplifier 122 or 124 is decremented. Similarly, if a signal xsig or ysig is below the lower threshold LT1, the gain of the respective Programmable Gain Amplifier 122 or 124 is incremented. This adjustment serves to keep the input signals xsig and ysig within the desired input signal range of the A/D input port 84. Beyond the programmable gain adjustment, the microprocessor 72 also incrementally adjusts the amplitude of the LED activation current produced by Programmable Current Source 96. As explained below in reference to FIG. 10, the activation current (beam current) is decremented to reduce the PSD output if either of the normalized range signals xnor, ynor exceeds an upper threshold UT2. Similarly, the beam current is incremented to increase the PSD output if xnor or ynor are below a lower threshold LT2. This serves to limit the dynamic range requirements of the receiver circuit 70, significantly reducing the cost of its components.

Figure 6:
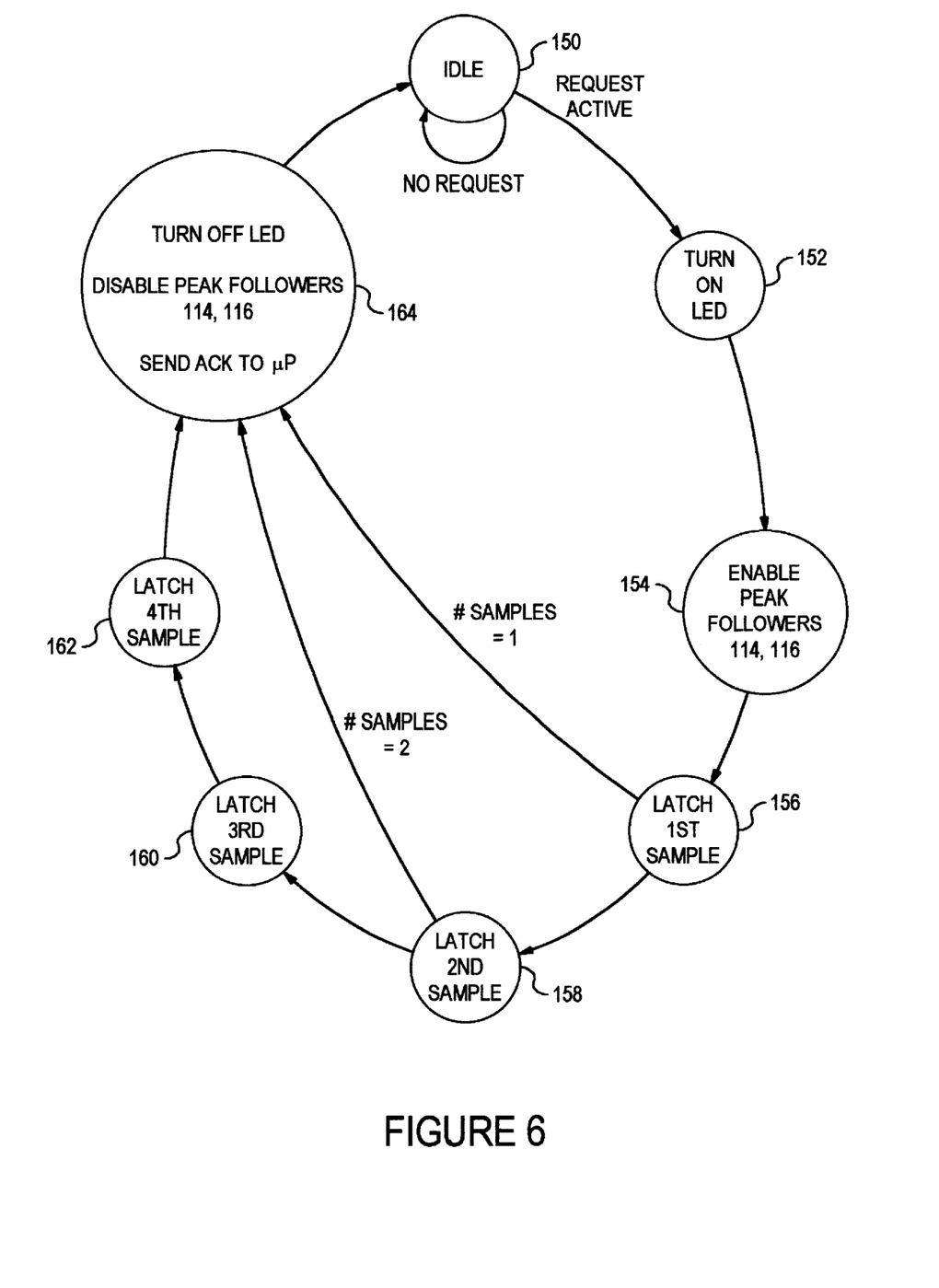
FIG. 6 is a diagram of the functions performed by the state machine of FIG. 5.

The above-described functions of the State Machine 76 are illustrated in diagrammatic form in FIG. 6. Referring to FIG. 6, the State Machine functionality is depicted by as comprising eight principle states designated by blocks 150–164. In the quiescent or idle condition designated by block 150, the State Machine is inactive, and waiting for an LED activation request from microprocessor 72 (via Request line 80). In response to an activation request, the State Machine progresses to block 152 and activates the Programmable Current Source 96 (via line 98) to pulse the LED element selected by the microprocessor 72. Then in succession at blocks 154 and 156, the Peak Follower circuits 114, 116 are enabled to track the peaks of the signals vx', vy' in synchronism with the peak values of the LED activation current, and the S/H circuits 126, 128 are signaled to latch the sampled input signals. If the microprocessor has requested only one sample, the State Machine 76 then proceeds to block 164, and deactivates the selected LED element, disables the Peak Follower circuits 114, 116, and issues an acknowledgement signal to microprocessor 72 (via line 82), indicating that the range signals xsig and ysig are available at the A/D port 84. Alternatively, if the microprocessor 72 has requested the State Machine to obtain and average two samples, the State Machine advances to the block 158 where the S/H circuits 126, 128 are commanded to latch a second sample before advancing to block 164. Or if the microprocessor 72 has requested the State Machine to obtain and average four samples, the State Machine additionally advances to the blocks 160 and 162 where the S/H circuits 126, 128 are commanded to latch third and fourth samples before advancing to block 164. In any event, the Averaging circuits 138, 140 automatically average the samples and the microprocessor 72 only reads the value after receiving the State Machine's acknowledgement signal at block 164. In practice, State Machine 76 may be implemented with a standard programmable logic array device, and significantly reduces the processing burden of the microprocessor 72, which is primarily concerned with analyzing the range information to determine if air bag deployment should be enabled or disabled based on occupant classification and/or position.

Figure 7:
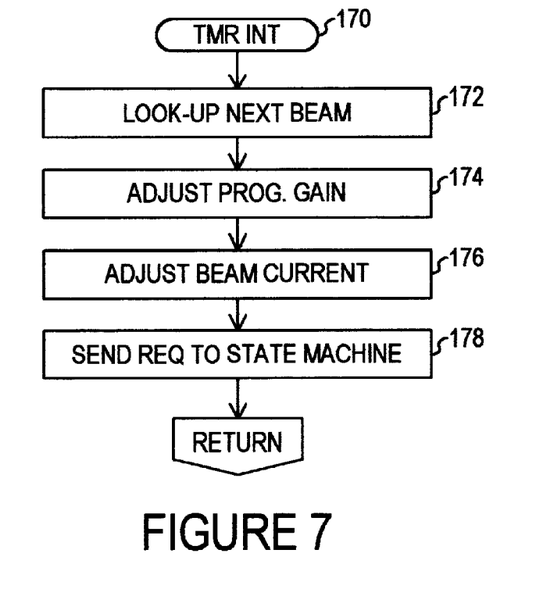
FIG. 7 depicts a periodically executed background routine for setting up and enabling activation of a selected LED element.

The flow diagrams of FIGS. 7–10 represent computer program instructions executed by the microprocessor 72 in carrying out the functions attributed to microprocessor 72 in the above discussion of FIG. 5. FIG. 7 is a routine executed periodically (that is, based on a timer interrupt) to set up and request activation of a selected LED element L. In response to the interrupt 170, the blocks 172–178 are executed in sequence to determine the selected LED element from a table created by the foreground routine of FIGS. 11 and 14, to adjust the gains of Programmable Gain Amplifiers 122, 124, to adjust the activation current of the selected LED, and to issue a request signal to State Machine 76 via Request line 80. The block 174 is detailed in the flow diagram of FIG. 9, and the block 176 is detailed in the flow diagram of FIG. 10.

Figure 8:
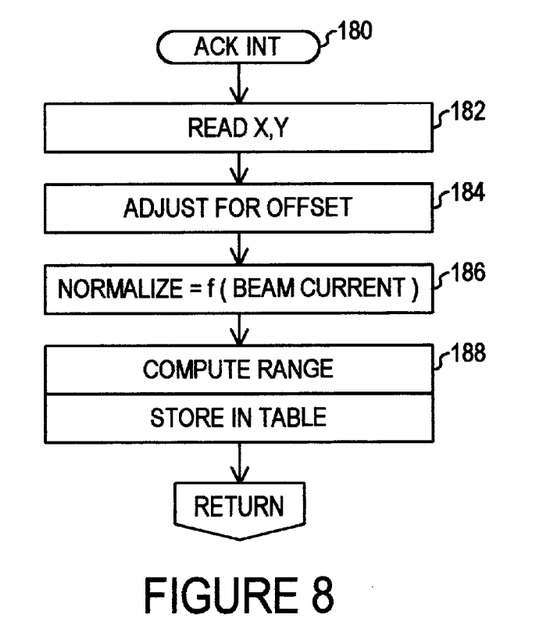
FIG. 8 depicts an interrupt driven routine for reading the received signal and computing occupant range.

FIG. 8 is a routine executed each time the State Machine signals via line 82 that the range signals are ready for access. In practice, the acknowledgement signal from State Machine 76 triggers an interrupt 180, and in response, the microprocessor sequentially executes the blocks 182–188, as indicated. This involves reading the inputs xsig, ysig adjusting their values for DC offsets, normalizing the adjusted values to account for the commanded amplitude of the activation current, and computing and storing the target range. As indicated above, the target range D is determined in accordance with the expression f*B/x, where x can be determined according to the expression (xnor−ynor)/(xnor+ynor), where xnor and ynor are the normalized range signals.

Figure 9:
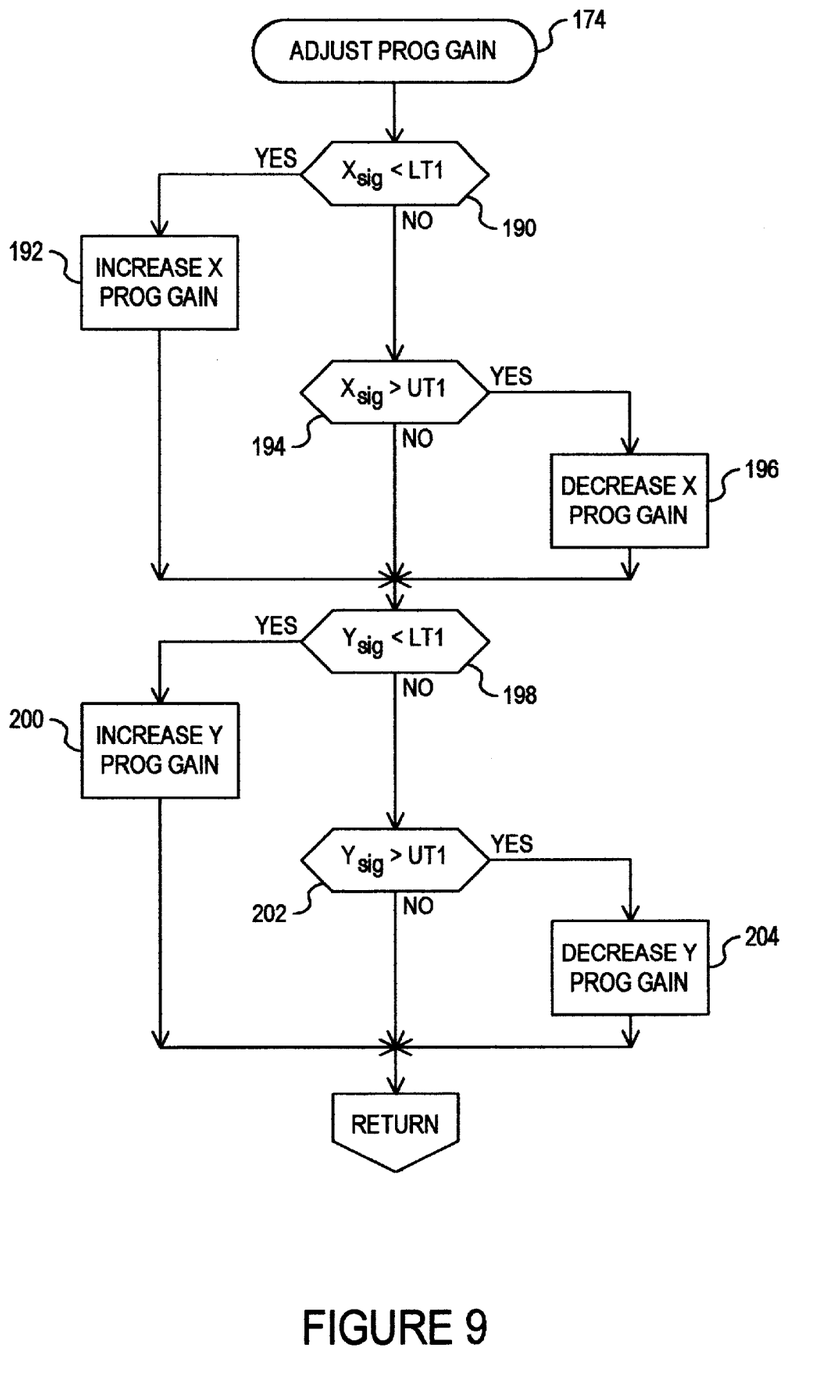
FIG. 9 depicts a portion of the flow diagram of FIG. 7 pertaining to adjustment of a programmable gain parameter.

Referring to the flow diagram of FIG. 9, the programmable gain adjustment of block 174 in FIG. 7 involves comparing the input signals xsig and ysig to predetermined upper and lower thresholds UT1 and LT1. If xsig is less than LT1, as determined at block 190, the block 192 is executed to increment the gain of Programmable Gain Amplifier 122. Similarly, if xsig is greater than UT1, as determined at block 194, the block 196 is executed to decrement the gain of Programmable Gain Amplifier 122. In a similar manner. the blocks 198–204 are then executed to increment the gain of Programmable Gain Amplifier 124 if ysig is less than LT1, and to decrement the gain of Programmable Gain Amplifier 124 if ysig is greater than UT1.

Figure 10:
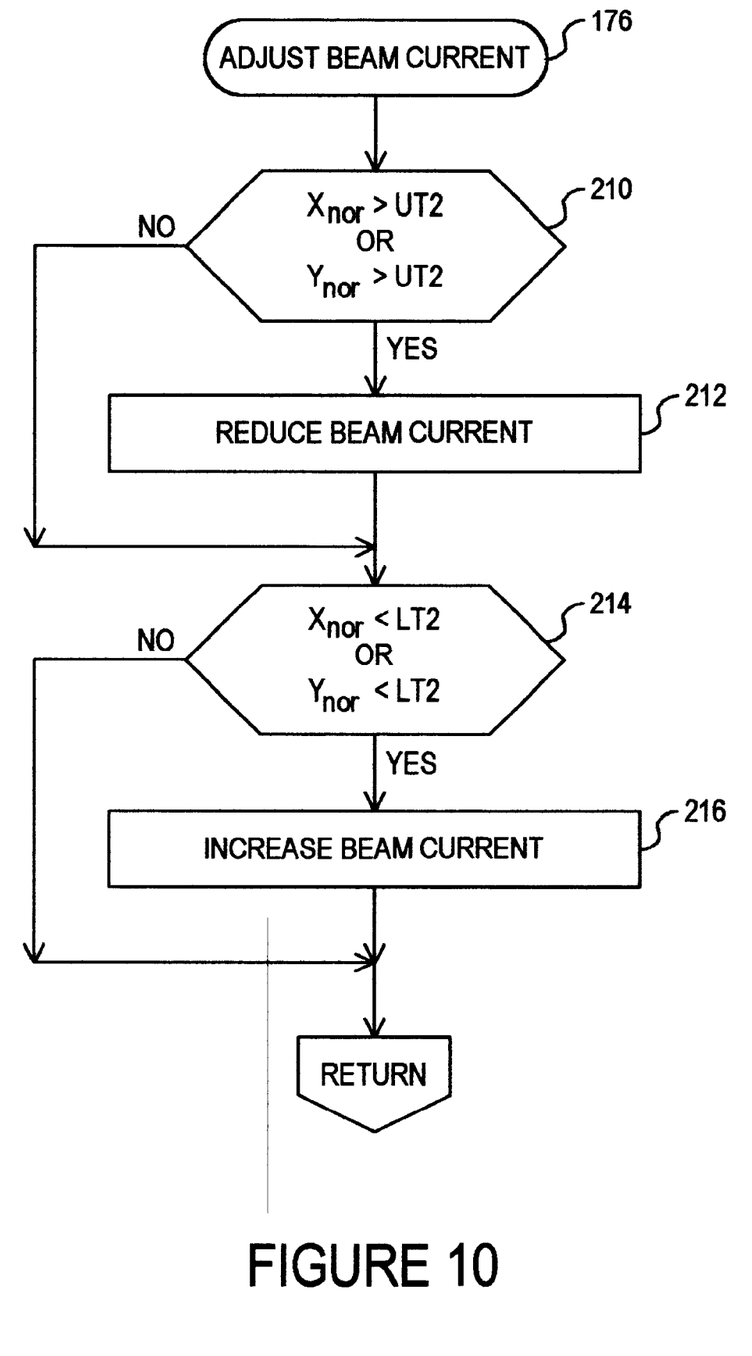
FIG. 10 depicts a portion of the flow diagram of FIG. 7 pertaining to adjustment of an activation current for the selected LED element.

Referring to the flow diagram of FIG. 10, the LED activation current adjustment of block 176 of FIG. 7 involves comparing the normalized input signals xnor and ynor to predetermined upper and lower thresholds UT2 and LT2. If xnor or ynor is greater than UT2, as determined at block 210, the block 212 is executed to reduce or decrement the requested beam (LED activation) current. If xnor or ynor is less than LT2, as determined at block 214, the block 216 is executed to increment the requested beam (LED activation) current.

Figure 11:
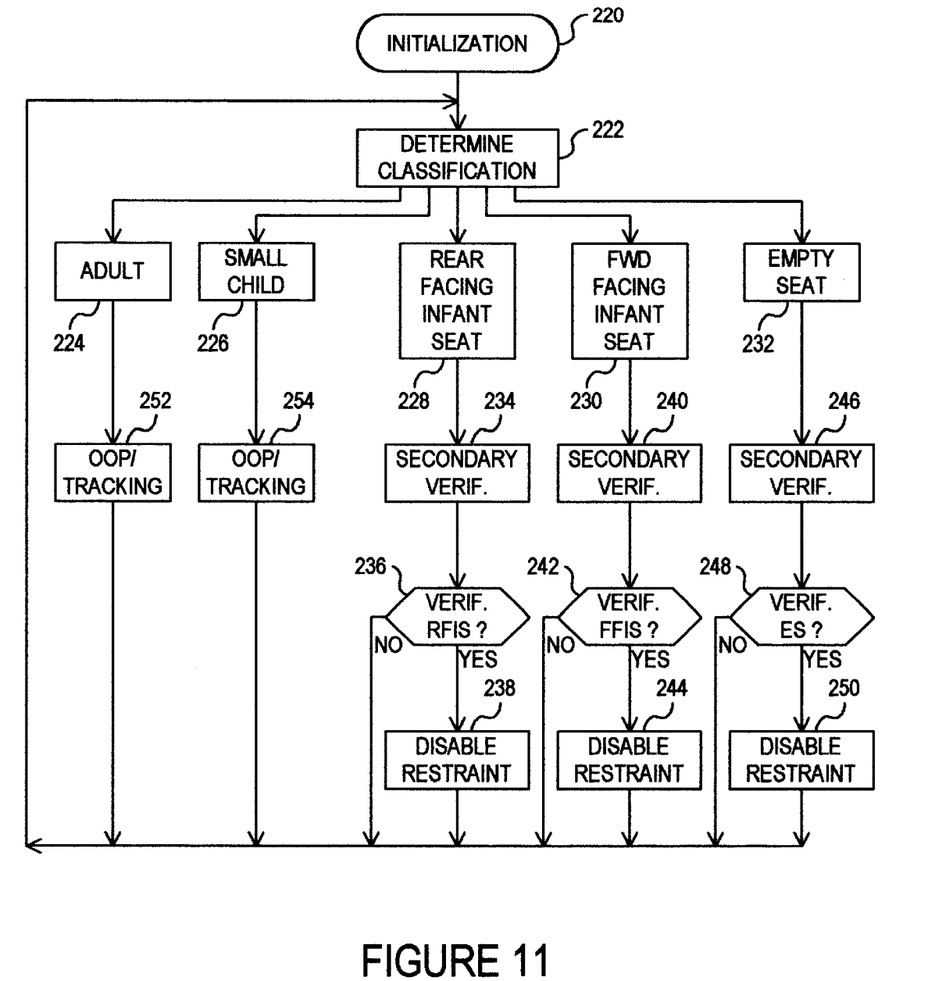
FIG. 11 depicts a foreground routine for selectively enabling and disabling the inflatable restraint based on the occupant classification and range information.

The flow diagram of FIG. 11 represents an executive or foreground software routine executed by the microprocessor 72 for analyzing the range data as it is received in order to classify and track an occupant of passenger seat 16 for the purpose of deciding whether to enable or disable deployment of the air bag 20. The block 220 designates a series of initialization instructions executed at the commencement of each period of vehicle operation for initializing various parameters and stored values to predetermined settings. Part of the initialization process, for example, may involve disabling deployment of the air bag 20 until classification can be resolved, and executing certain diagnostic or self-check routines. Also, various timer values and timer interrupt sequences are initialized, such as the timer interrupt discussed in reference to FIG. 7 for requesting occupant range data. Following initialization, the block 222 is executed to determine, based on the currently available occupant range data, whether the passenger seat 16 is occupied by a forward facing infant seat (FFIS), a rear facing infant seat (RFIS), a small child, or an adult, or if the seat is simply unoccupied. The software routines of block 222 contain a set of rules to which the range data of array 40 is applied for discriminating between the various occupant classifications. The rules are developed empirically by gathering libraries of data representative of different occupants, seating positions, clothing, etc., and using signal processing techniques to develop rules that identify range data characteristic of a particular occupant classification. Once the classification has been determined, and verified as explained below, the determination is "locked in" unless a major shift in range data occurs; for example, a change in occupants.

If the classification rules indicate that the passenger seat is unoccupied, the blocks 232 and 246 are executed to indicate an "empty seat" classification, and to perform secondary testing designed to either increase or decrease the confidence in the indicated classification. The tests of block 246 tend to be heuristic in nature, and may involve for example, monitoring for lack of movement in the scanned area. If the secondary testing tends to verify the indicated classification, as determined at block 248, the classification is locked-in, and the block 250 is executed to disable deployment of the air bag 20. Similarly, if the classification rules of block 222 indicate that the passenger seat is occupied by a forward facing infant seat, the blocks 230 and 240 are executed to indicate a "FFIS" classification, and to perform secondary testing designed to either increase or decrease the confidence in the indicated classification. In this case, the secondary testing may involve for example, monitoring for a limited movement in the central portion of the scanned area. If the secondary testing tends to verify the indicated classification, as determined at block 242, the classification is locked-in, and the block 244 is executed to disable deployment of the air bag 20. Similarly, if the classification rules of block 222 indicate that the passenger seat is occupied by a rear facing infant seat, the blocks 228 and 234 are executed to indicate a "RFIS" classification, and to perform secondary testing designed to either increase or decrease the confidence in the indicated classification. As with the FFIS, the secondary testing may involve for example, monitoring for a limited movement in the central portion of the scanned area. If the secondary testing tends to verify the indicated classification, as determined at block 236, the classification is locked-in, and the block 238 is executed to disable deployment of the air bag 20.

If the classification rules of block 222 indicate that the passenger seat is occupied by a small child, the blocks 226 and 254 are executed to indicate a "small child" condition, and to perform tracking and out-of-position (OOP) testing, as described below. Similarly, if the classification rules of block 222 indicate that the passenger seat is occupied by an adult, the blocks 224 and 252 are executed to indicate an "adult" condition, and to perform tracking and out-of-position (OOP) testing. The tracking and OOP testing are described below in reference to FIGS. 12–14 in a manner that is generic to both the adult and small child classifications. The primary difference is that the OOP thresholds are separately specified for each occupant classification.

Figure 12:
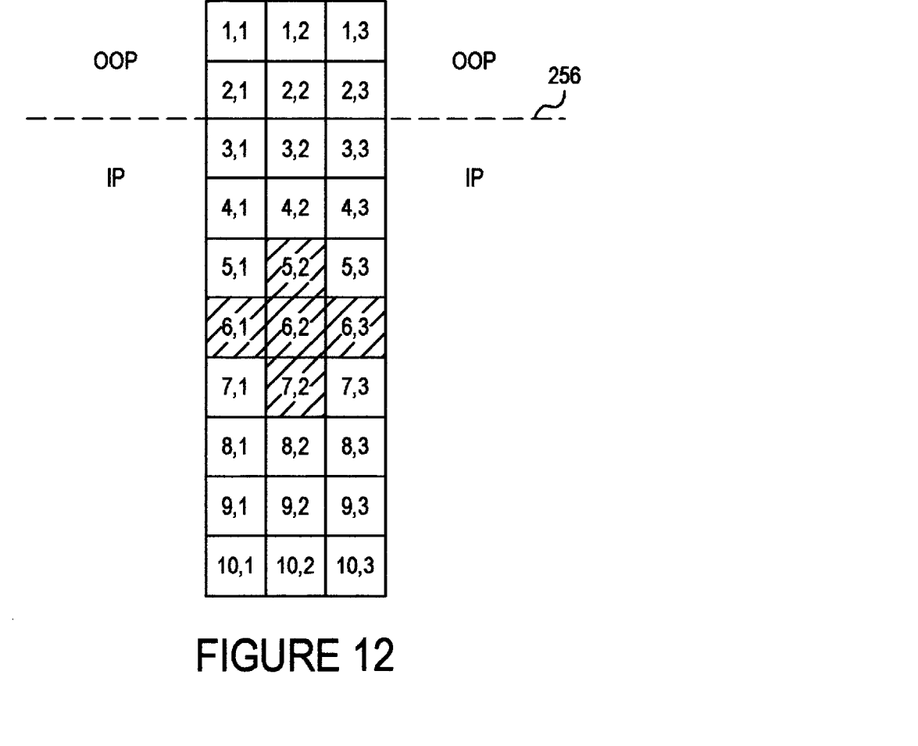
FIGS. 12 and 13 depict portions of the emitter array of FIGS. 3–4 in relation to the flow diagram of FIG. 14.
Figure 13:
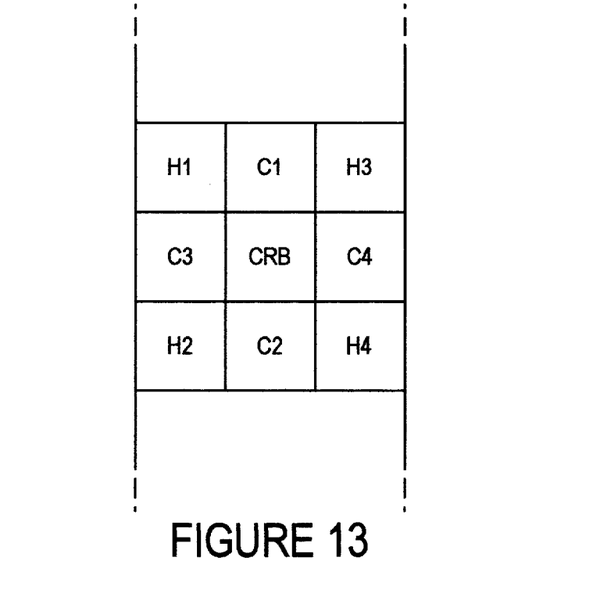

In general, the tracking function involves identifying the head/torso portion of the imaged occupant based on range, forming a grouping of IR beam positions corresponding thereto, and updating the range of those beam positions at a very fast rate so that the position of the head/torso can be tracked relative to a predefined OOP threshold—i.e., a predefined distance from the point of deployment of the air bag 20. In the illustrated embodiment, the grouping of IR beams comprises a "cone" of five contiguous emitter array positions most closely associated with the identified head/torso position, and a "halo" of four emitter array positions surrounding the "cone". This concept is illustrated in FIGS. 12–13. FIG. 12 depicts the emitter array 40 as a series of contiguous squares identified by the row, column locations discussed above in respect to FIG. 3. Thus, the beam position 1/1 corresponds to the LED L1,1, and so on, with the beam positions of row one (positions 1/1, 1/2 and 1/3) illuminating the viewing area closest to the air bag 20. An example of a cone for an in-position occupant is shown by the shaded positions (5/2, 6/1, 6/2, 6/3 and 7/2), and the OOP threshold, for an adult for example, is represented by the broken line 256, the recognized occupant being considered in-position (IP) if the "cone" beams are below the threshold (i.e., in row three and higher), and out-of-position (OOP) if at least one of the "cone" beams crosses the threshold. The "halo" positions for the example "cone" are the surrounding beam positions 5/1, 5/3, 7/1 and 7/3. The halo positions are not used to enable or disable deployment, per se, but simply define a region surrounding and in proximity to the cone grouping for improved tracking.

In the illustrated embodiment, the system 10 is mounted in an overhead console as described in reference to FIG. 1, and the center beam position (i.e., in column two of the array) of the row having the shortest range from system 10 is used to form the center of the cone. For example, if it has been determined that an adult or small child is occupying the passenger seat 16, and a comparison of the range data obtained from a complete scan of the viewing area as illustrated in FIG. 1 reveals that the minimum range corresponds to the LED beam position 6/1, the microprocessor 72 selects the center beam position in row six (i.e., position 6/2) as the center of the cone, and constructs the remainder of the cone and halo as shown in FIG. 12. This is shown more clearly in FIG. 13, where the cone is seen as comprising the center beam position (CRB) and the contiguous positions C1, C2, C3 and C4, and the halo comprises the surrounding positions H1, H2, H3 and H4.

Figure 14:
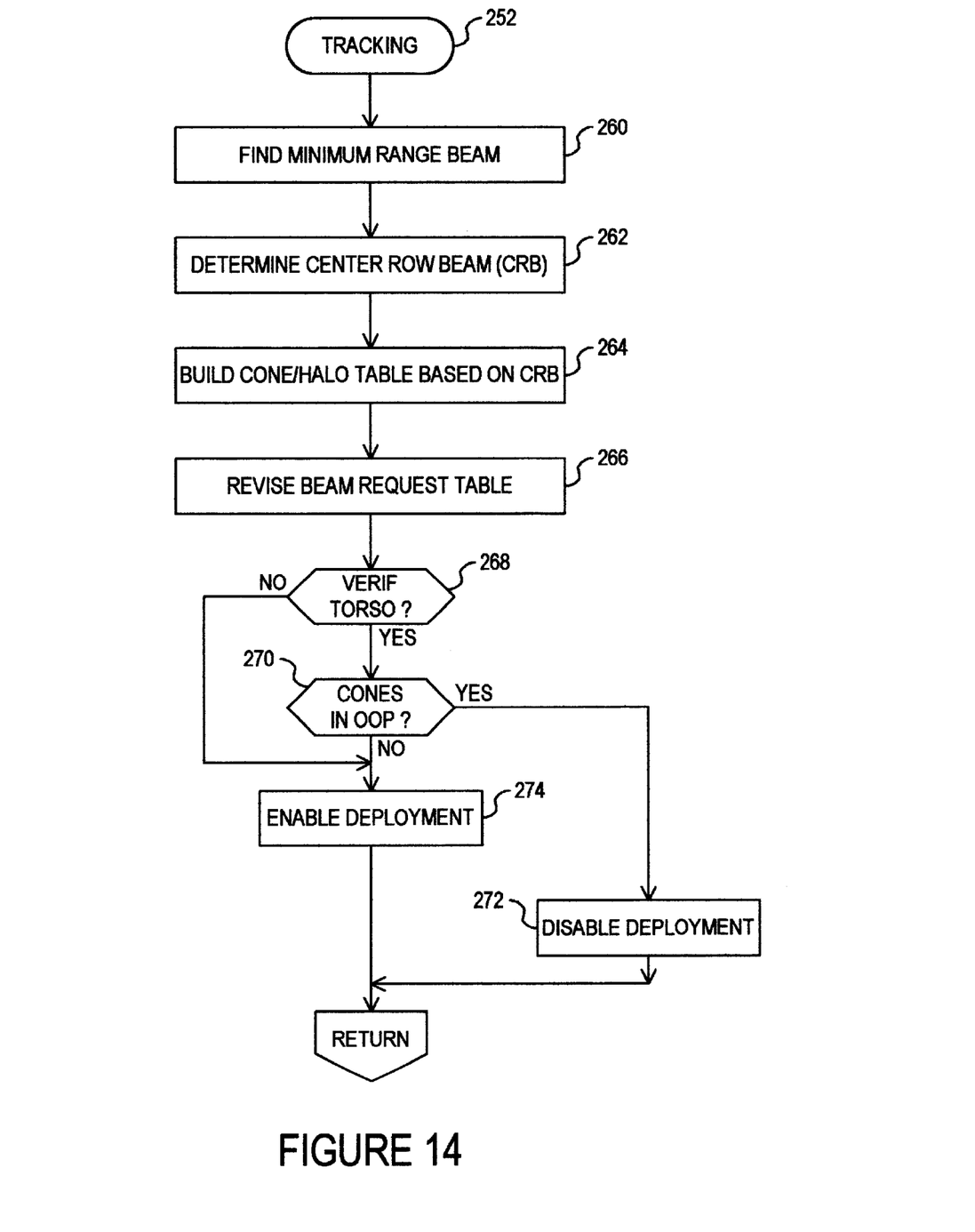
FIG. 14 depicts a portion of the foreground routine of FIG. 11 pertaining to dynamic tracking of a recognized or classified occupant.

FIG. 14 depicts the tracking and OOP block 252 of FIG. 11 in more detail. Initially, blocks 260–264 are executed to identify the minimum range position of the array 40, to determine the center row position associated with the identified minimum range position, and to build a cone/halo table based on that center row position. This will be recognized as the process described above in reference to FIGS. 12–13. The cone/halo table is simply a table that lists the emitter array positions (beam positions) that form the cone and the halo of the IR beam grouping centered on the head/torso of the recognized adult or small child passenger. Once the table has been created, the block 266 is executed to update a "beam request table" that indicates the relative priority of the various beam positions, with beam positions having a higher priority being scanned more frequently that beam positions of lower priority. In the illustrated embodiment, there are three different priorities: low, medium and high. The cone positions identified at block 264 are stored in the high priority list of the beam request table, and are scanned more frequently than any of the other beam positions. The halo positions identified at block 264 are stored in the medium priority list of the beam request table, and are scanned more frequently than non-cone and non-halo positions, but less frequently than the cone positions. When the interrupt service routine block 172 of FIG. 7 is executed in response to the timer interrupt, the microprocessor 72 reads the beam request table, and decides which LED element to activate accordingly. By way of example, the microprocessor 72 can scan the halo positions several times as often as the normal priority positions, and the cone positions several times as often as the halo positions. Scanning the cone and halo beam positions at a high rate improves the ability of the system 10 to dynamically track a moving head/torso since the head/torso is identified by range, and most critical range information is updated at a very fast rate.

The block 268 is then executed to verify that the IR grouping is tracking the occupant's head/torso, as opposed to a hand or newspaper, for example. This is achieved by determining the difference in range between adjacent cone positions, and distinguishes an occupant's head/torso from an outstretched arm, for example. If the head/torso is verified, the blocks 270–274 are executed to enable or disable deployment of the air bag 20 based on a comparison of the IR beam grouping relative to the OOP threshold. If any cone position of the IR beam grouping has crossed the OOP threshold, block 272 disables deployment, and if no cones have crossed the OOP threshold, block 274 enables deployment. If a head/torso is not verified, deployment of the air bag 20 is enabled. In a preferred embodiment, the block 270 also keeps track of the rate of change in position of the IR beam grouping so that movement of a cone into the OOP zone can be anticipated prior to actual crossing of the OOP threshold.

In summary, the present invention provides a reliable, easily packaged, and cost efficient occupant recognition and position detection system for motor vehicle applications. As pointed out above, the illustrated embodiment is intended to be exemplary in nature, and it is expected that various modifications will occur to those skilled in the art. As such, it will also be understood, that systems incorporating such modifications may fall within the scope of this invention, which is defined by the appended claims.

What is claimed is:

1. A system for detecting a position of an occupant of a motor vehicle including an IR transmitter for emitting a beam of IR light through an optical lens for reflection off the occupant, an IR receiver for receiving the reflected IR light and forming an occupant range related input signal therefrom, and a controller coupled to said IR transmitter and IR receiver for determining the position of the occupant from said input signal, an improvement wherein:

the IR transmitter includes an IR light emitting diode for emitting said beam of IR light, and a current source effective when enabled to activate said light emitting diode with a sinusoidal current of predetermined frequency so that the emitted beam of IR light has an intensity that is modulated at said predetermined frequency;

the IR receiver includes a photo-sensitive device that generates a current signal having an occupant range related component at said predetermined frequency and representing the range of said occupant, and a band-pass filter for extracting said occupant range related component from said current signal to form said input signal.

2. The improvement of claim 1, wherein:

the IR receiver includes a peak following circuit for tracking an instantaneous peak value of said input signal when enabled by said controller; and the controller includes means for enabling said peak following circuit so as to detect said occupant range related component in synchronism with peak values of said sinusoidal current to form said input signal.

3. The improvement of claim 1, wherein said photo-sensitive device generates first and second current signals, each having an occupant range related component at said predetermined frequency, and said IR receiver includes first and second band-pass filters for coupled to said first and second current signals for respectively extracting first and second range related components therefrom to form first and second input signals for said controller.

4. The improvement of claim 3, wherein the IR receiver includes first and second peak following circuits for tracking instantaneous values of said first and second range related components when enabled by said controller; and the controller includes means for enabling said first and second peak following circuits so as to detect peak values of said first and second range related components in synchronism with peak values of said sinusoidal current to form said first and second input signals.

5. A system for detecting a position of an occupant of a motor vehicle including an IR transmitter for emitting a beam of IR light through an optical lens for reflection off the occupant, an IR receiver for receiving the reflected IR light and forming an occupant range related input signal therefrom, and a controller coupled to said IR transmitter and IR receiver for determining a range of the occupant from said input signal, an improvement wherein:

the IR receiver includes a photo-sensitive device that generates a current signal having an occupant range related component representing the range of said occupant, a circuit for extracting such component from said current signal, and a programmable gain amplifier for amplifying the extracted component to form said input signal; and the controller receives the input signal at an input port thereof, and adjusts the gain of said programmable gain amplifier based on a magnitude of the received input signal so as to drive said input signal into a desired input range of said input port.

6. The improvement of claim 5, wherein:

the controller includes a microprocessor, and the input port is an analog-to-digital input port of the microprocessor.

7. The improvement of claim 5, wherein:

the controller increases the gain of the programmable gain amplifier if the received input signal is lower than said desired input range, and decreases the gain of the programmable gain amplifier if the received input signal is higher than said desired input range.

8. The improvement of claim 5, wherein:

said photo-sensitive device generates first and second current signals, each having an occupant range related component, and said IR receiver includes first and second circuits for respectively extracting the first and second components from said first and second current signals, and first and second programmable gain amplifiers for amplifying the extracted first and second components to form first and second input signals for said controller; and said controller receives the first and second occupant range related input signals at said input port, and individually adjusts the gain of said first and second programmable gain amplifiers based on respective magnitudes of the received first and second input signals so as to drive the first and second input signals into a desired input range of said input port.

9. A system for detecting a position of an occupant of a motor vehicle including an IR transmitter for emitting a beam of IR light through an optical lens for reflection off the occupant, an IR receiver for receiving the reflected IR light and forming first and second occupant range related input signals therefrom, and a controller coupled to said IR transmitter and IR receiver for determining a range of the occupant from said input signals, an improvement wherein:

the IR receiver includes a photo-sensitive device that produces first and second currents used to form said first and second input signals;

the IR transmitter includes an IR light emitting diode for emitting said beam of IR light, and a current source effective when enabled to activate said light emitting diode with an activation current having a selectable magnitude, the first and second currents produced by said photo-sensitive device of said IR receiver having magnitudes that vary in relation to the selected magnitude of said activation current; and     the controller receives the first and second occupant range related input signals, determines a range of the occupant based on a ratio of such received first and second input signals, and selects the magnitude of said current source based on a magnitude of the received first and second input signals so as to limit a range in magnitude of the first and second currents.

10. The improvement of claim 9, wherein:

the controller selects an increased magnitude of said current source if the received first or second input signals are lower than a first predetermined threshold, and selects a decreased magnitude of said current source if the received first or second input signals are higher than a second predetermined threshold, said first and second predetermined thresholds corresponding to a desired range in variation of said first and second currents.

11. A system for detecting a position of an occupant of a motor vehicle including an IR transmitter for emitting a beam of IR light through an optical lens for reflection off the occupant, an IR receiver for receiving the reflected IR light and developing an occupant range related input signal therefrom, and a controller coupled to said IR transmitter and IR receiver for determining the position of the occupant from said input signal, an improvement wherein:

the IR transmitter includes an array of IR light emitters that are individually and selectively activated to emit beams of IR light corresponding to respective positions of the activated IR light emitters in said array;

the controller includes:

a microprocessor for requesting activation of a selected IR light emitter, receiving the input signal corresponding to the selected IR light emitter, and determining the occupant position based on a plurality of said input signals; and         a state machine that operates in response to a requested activation of a selected IR light emitter to enable activation of the selected IR light emitter by the IR transmitter and reception of the reflected IR light by the IR receiver, and to signal the microprocessor that the input signal corresponding to the selected IR light emitter is ready to be received.

12. The improvement of claim 11, wherein:

the IR transmitter activates the selected IR light emitter so as to modulate the emitted beam of IR light at a predetermined frequency;

the IR receiver includes a sensor and circuit for producing a range related oscillatory signal at said predetermined frequency, and a detection circuit for detecting an instantaneous value of said oscillatory signal to form said input signal; and     the state machine enables said detection circuit to detect the value of said oscillatory signal in synchronism with the modulation of the emitted beam of IR light.

13. The improvement of claim 11, wherein:

the IR receiver develops a range related signal, and includes a sampling circuit effective when enabled to sample and average one or more values of said range related signal;

the microprocessor determines a specified number of times that said range related signal should be sampled; and     the state machine enables said sampling circuit said specified number of times before signaling the microprocessor that the an input signal corresponding to the selected IR light emitter is ready to be received.

14. A system for detecting a position of an occupant of a motor vehicle including an IR transmitter for emitting a beam of IR light through an optical lens for reflection off the occupant, an IR receiver for receiving the reflected IR light and developing an occupant range related input signal therefrom, and a controller coupled to said IR transmitter and IR receiver for determining the position of the occupant from the input signal, an improvement wherein:

the IR transmitter includes a two-dimensional array of IR light emitting diodes that are individually and selectively activated to emit a beam of IR light corresponding to a position of the activated IR light emitting diode in said array, said array including a first plurality of parallel conductor segments defining columns of said array and a second plurality of parallel conductor segments oriented perpendicular to said first plurality of segments and defining rows of said array, each of said IR light emitting diodes being positioned at a unique intersection of a row and column of said array, and activated when the conductor segments defining such row and column are coupled to a current source.

15. The improvement of claim 14, wherein:

each of the IR light emitting diodes has a first terminal mounted on a column conductor segment, and a second terminal that is wire-bonded to a row conductor segment adjacent said column conductor segment.

16. The improvement of claim 14, wherein:

said array includes a plurality of insulator segments disposed between said first and second plurality of conductor segments at least at the intersections thereof so as to electrically isolate said first and second plurality of conductor segments.

17. The improvement of claim 14, wherein:

the array includes a cover layer of opaque material substantially covering said first and second pluralities of conductor segments except in proximity to the row and column intersections of said array, thereby defining cavities in which said IR light emitting diodes are positioned.

18. The improvement of claim 17, wherein said cover layer has a thickness sufficient to substantially prevent dispersion of IR light emitted by said IR light emitting diodes.

19. A system for detecting a position of an occupant of a motor vehicle including an IR transmitter for emitting a beam of IR light through an optical lens for reflection off the occupant, an IR receiver for receiving the reflected IR light and developing an occupant range related input signal therefrom, and a controller coupled to said IR transmitter and IR receiver for determining the position of the occupant relative to a predefined zone of the vehicle, an improvement wherein:

the IR transmitter includes a two-dimensional array of IR light emitters that are individually and selectively activated to emit a beam of IR light corresponding to a position of the activated IR light emitter in said array;

the controller selectively and repeatedly activates each of the IR light emitters in a determined sequence and receives corresponding input signals to identify an emitter array position corresponding to a beam of IR light illuminating a head/torso of the occupant, and to indicate when the identified emitter array position corresponds to a beam of emitted light passing through said predefined zone.

20. The improvement of claim 19, wherein:

the controller is mounted on a portion of said vehicle which is higher than the occupant; and the array position corresponding to a minimum detected occupant range is identified as the position that illuminates the head/torso of the occupant.

21. The improvement of claim 19, wherein:

the controller forms a grouping of array positions contiguous with said identified position, and indicates when any position in the grouping corresponds to a beam of emitted light passing through said predefined zone.

22. The improvement of claim 21, wherein:

the controller compares range information corresponding to the contiguous positions of said grouping, and confirms that said positions correspond to beams of IR light illuminating the head/torso of the occupant when a variation of said compared range information is less than a predetermined amount.

23. The improvement of claim 21, wherein:

the controller activates the IR light emitters corresponding to the grouping of positions of said array at a repetition rate that is higher than for other positions of said array.

24. The improvement of claim 19, wherein:

the controller activates the IR light emitter corresponding to the identified position of said array at a repetition rate that is higher than for other positions of said array.

\* \* \* \* \*